(12) United States Patent
Cheng et al.

(10) Patent No.: US 8,029,077 B2
(45) Date of Patent: Oct. 4, 2011

(54) COMPUTER HOUSING AND FLATTENABLE FRAME FOR THE COMPUTER HOUSING

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 988 days.

(21) Appl. No.: 11/761,092

(22) Filed: Jun. 11, 2007

(65) Prior Publication Data

US 2008/0002349 A1   Jan. 3, 2008

(30) Foreign Application Priority Data

Jun. 30, 2006   (TW) ................................ 95211543 U

(51) Int. Cl.
*A47B 43/00*   (2006.01)
(52) U.S. Cl. .................... 312/262; 312/223.2; 361/679.6
(58) Field of Classification Search .................. 312/258, 312/223.2, 265.5, 262; 220/4.28, 6, 7; 361/679.01, 361/679.02, 679.6; 248/188.6, 346.3
See application file for complete search history.

(56) References Cited

U.S. PATENT DOCUMENTS

| | | | | |
|---|---|---|---|---|
| 2,674,761 | A * | 4/1954 | Weiss | 16/288 |
| 5,035,026 | A * | 7/1991 | Carlo et al. | 16/288 |
| 5,069,144 | A * | 12/1991 | Williford | 108/129 |
| 5,471,709 | A * | 12/1995 | Lanzani | 16/238 |
| 6,158,831 | A * | 12/2000 | Brown et al. | 312/258 |
| 6,231,140 | B1 * | 5/2001 | Chen | 312/223.2 |
| 6,243,918 | B1 * | 6/2001 | Zetti | 16/298 |
| 6,382,744 | B1 * | 5/2002 | Xiao | 312/223.2 |
| 6,906,927 | B2 * | 6/2005 | Su | 361/727 |
| 7,248,464 | B1 * | 7/2007 | Chiang | 361/679.55 |
| 7,257,827 | B2 * | 8/2007 | Lee | 720/653 |
| 2003/0075541 | A1 * | 4/2003 | Bartasevich et al. | 220/6 |
| 2005/0218766 | A1 * | 10/2005 | Hwang | 312/405 |
| 2006/0043090 | A1 * | 3/2006 | Ferrini | 220/6 |

* cited by examiner

*Primary Examiner* — Darnell Jayne
*Assistant Examiner* — Andres F Gallego
(74) *Attorney, Agent, or Firm* — Stephen A. Bent; Foley & Lardner LLP

(57) ABSTRACT

A computer housing includes a frame and a face panel. The frame includes a plurality of pivotally interconnected frame panels such that the frame is convertible between an assembled state and a flattened state. In the assembled state, the frame panels form a rectangular frame for mounting electronic components, such as a motherboard, a disk drive and a hard disk. In the flattened state, the frame can be flattened out so that the frame panels lie in substantially the same plane, thereby reducing the space occupied by the frame.

10 Claims, 6 Drawing Sheets

COMPUTER HOUSING AND FLATTENABLE FRAME FOR THE COMPUTER HOUSING

CROSS-REFERENCE TO RELATED APPLICATION

This application claims priority of Taiwanese Application No. 095211543, filed on Jun. 30, 2006.

BACKGROUND OF THE INVENTION

1. Field of the Invention

The invention relates to a computer housing, more particularly to a computer housing having a frame that can be flattened out.

2. Description of the Related Art

Referring to FIG. 1, a conventional computer housing 1 generally includes a top frame panel 11, a bottom frame panel 12, and a front frame panel 13 and a rear frame panel 14 interconnecting front and rear frame edges of the top and bottom frame panels 11, 12. The four frame panels 11, 12, 13, 14 are interconnected to form a rectangular frame. The computer housing 1 further includes a lateral frame panel 15 for securing a motherboard (not shown). Since the aforesaid frame panels are generally secured in place by riveting, the structure of the rectangular frame is usually fixed and cannot be disassembled or folded. Such an arrangement can maintain the sturdiness of the structure of the housing, and the user does not need to perform any assembling operation after purchase.

However, a drawback of the computer housing 1 is that, since the size and structure of the housing are fixed, a corresponding storage space is required during transport or displaying of the housing. Relatively, the necessary transport cost is constantly kept at a certain level and cannot be reduced.

In an era of keen competitions and low profit margins, it is hoped that the costs involved with the production of products can be cut down in every aspect, so that the obtainable profits can be relatively increased.

SUMMARY OF THE INVENTION

Therefore, an object of the present invention is to provide a flattenable frame for a computer housing, the frame being flattenable to save space during transportation and storage.

Another object of the present invention is to provide a computer housing, the computer housing having a frame which is flattenable to save space during transport and storage.

Accordingly, a flattenable frame for a computer housing of the present invention includes a plurality of frame panels which are interconnected pivotally such that the frame is convertible between an assembled state and a flattened state. In the assembled state, the frame panels form a rectangular frame for mounting electronic hardware devices, such as a power supply, a motherboard, an optical disk drive, and a hard disk drive, therein so as to form a computer device. In the flattened state, the frame panels are flattened out so as to be disposed in substantially the same plane, thereby reducing the space occupied by the frame during transport and storage.

A computer housing of the present invention includes a frame and a face panel. The frame includes a lateral frame panel, and front, rear, top, and bottom frame panels that are connected respectively and pivotally to four panel edges of the lateral frame panel and that are located at a same side of the lateral frame panel. The frame panels are flattenable to be disposed in substantially the same plane so as to reduce the space occupied by the frame. The face panel is disposed on a front side of the front frame panel.

Since the volume of the frame is reduced when it is converted to the flattened state from the assembled state, savings in storage space and transport cost can be achieved. Besides, the flattened-out frame can be easily assembled for use. Thus, the frame of this invention also has the advantage of convenient assembly.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
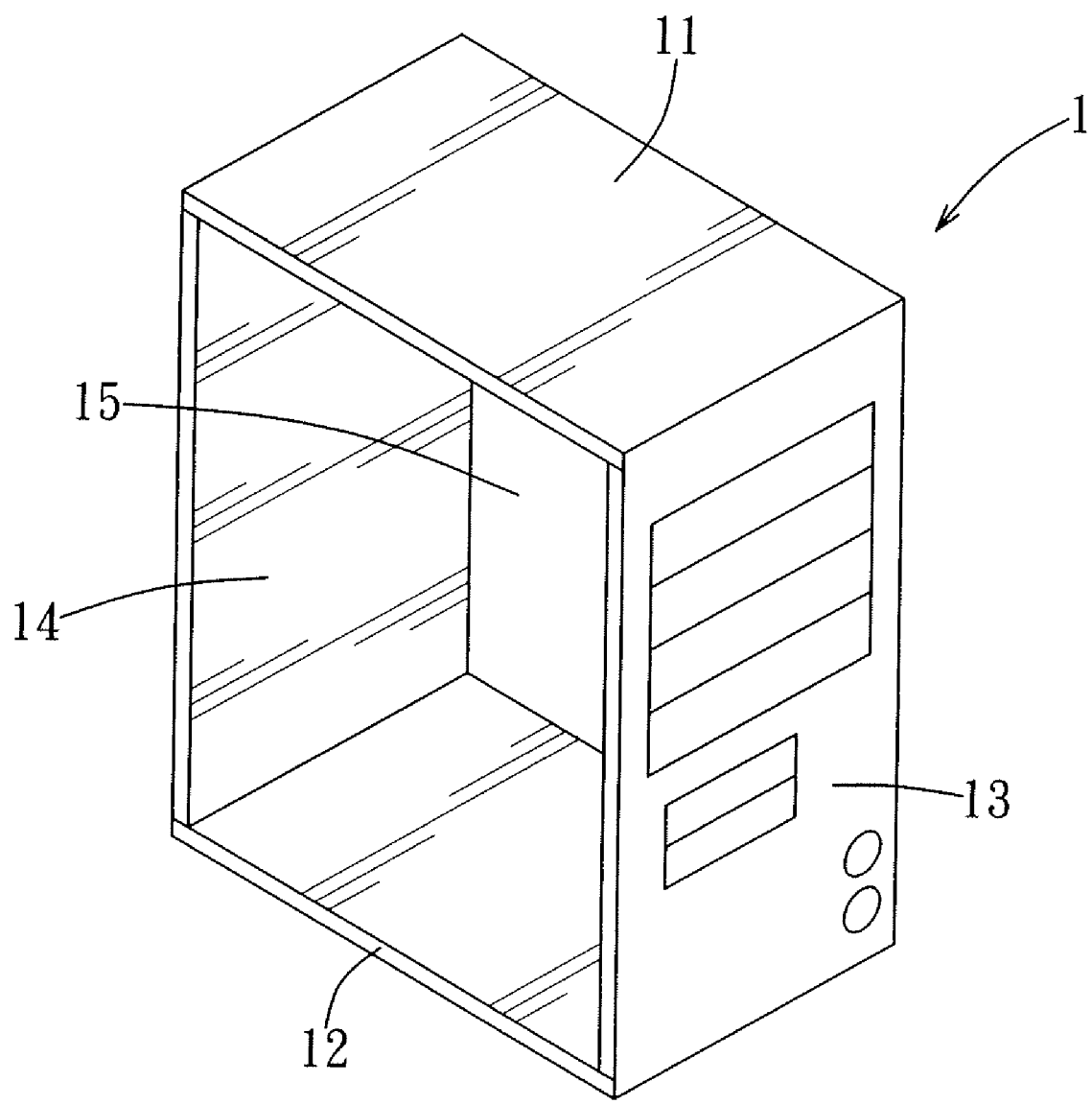
FIG. 1 is a perspective view to illustrate a conventional computer housing having a fixed structure.
Figure 2:
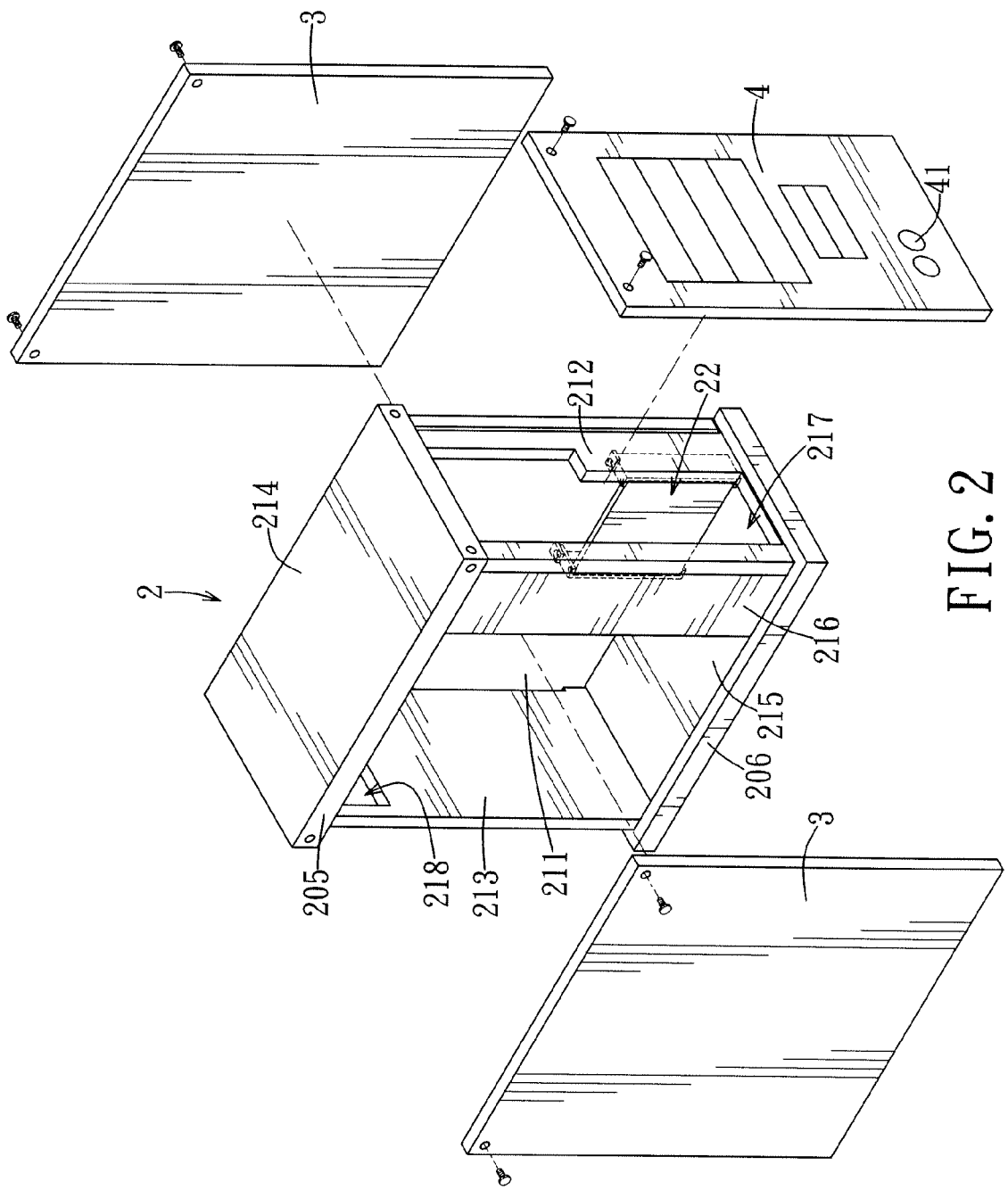
FIG. 2 is an exploded perspective view of a preferred embodiment of a flattenable computer housing according to the present invention.
Figure 3:
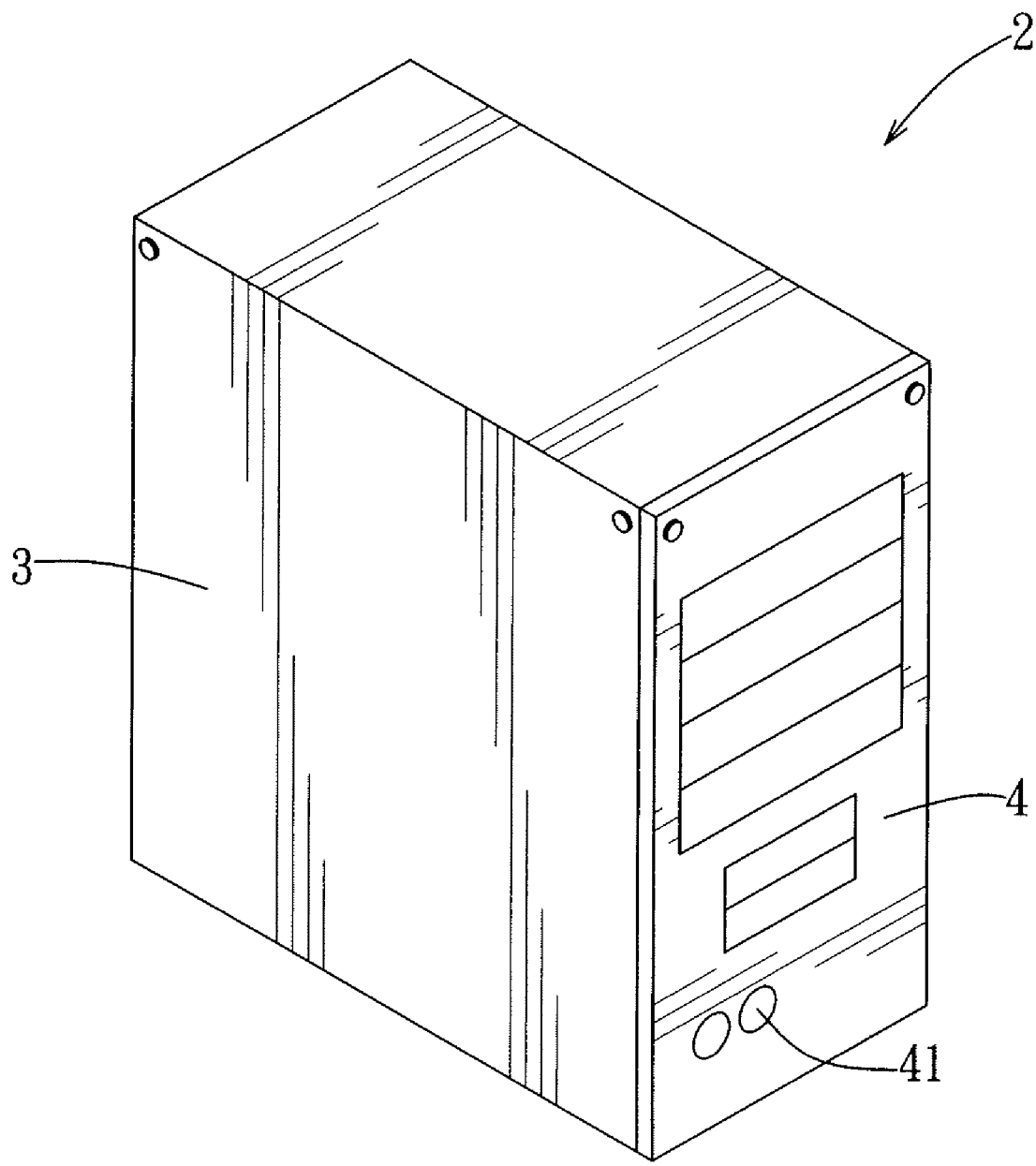
FIG. 3 is an assembled perspective view of the preferred embodiment.

Referring to FIGS. 2 and 3, the preferred embodiment of a computer housing according to this invention is shown to include a frame 2, two outer side plates 3, and a face panel 4. The face panel 4 is provided with a switch button 41.

Figure 4:
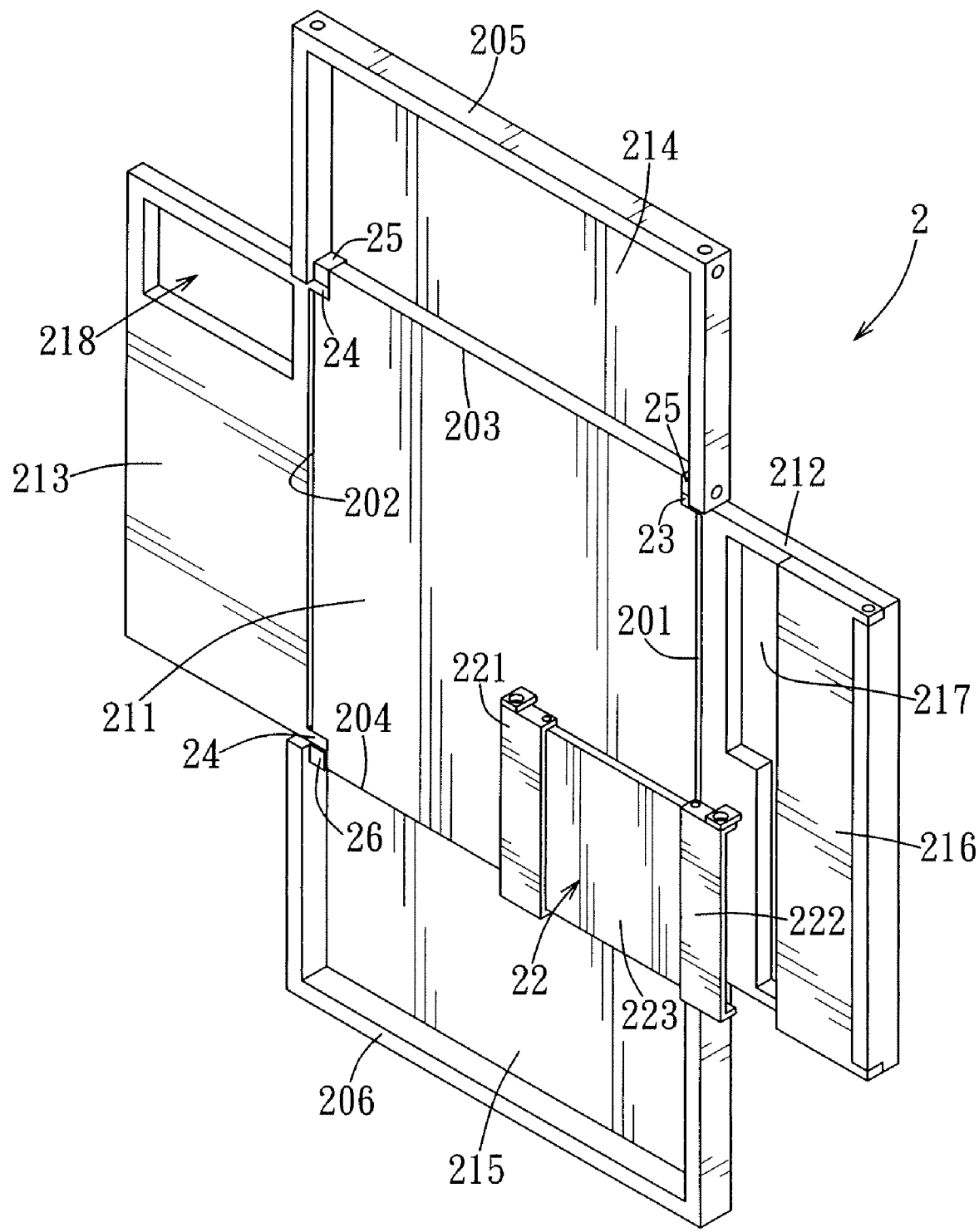
FIG. 4 is a perspective view to illustrate the preferred embodiment in a flattened state.
Figure 5:
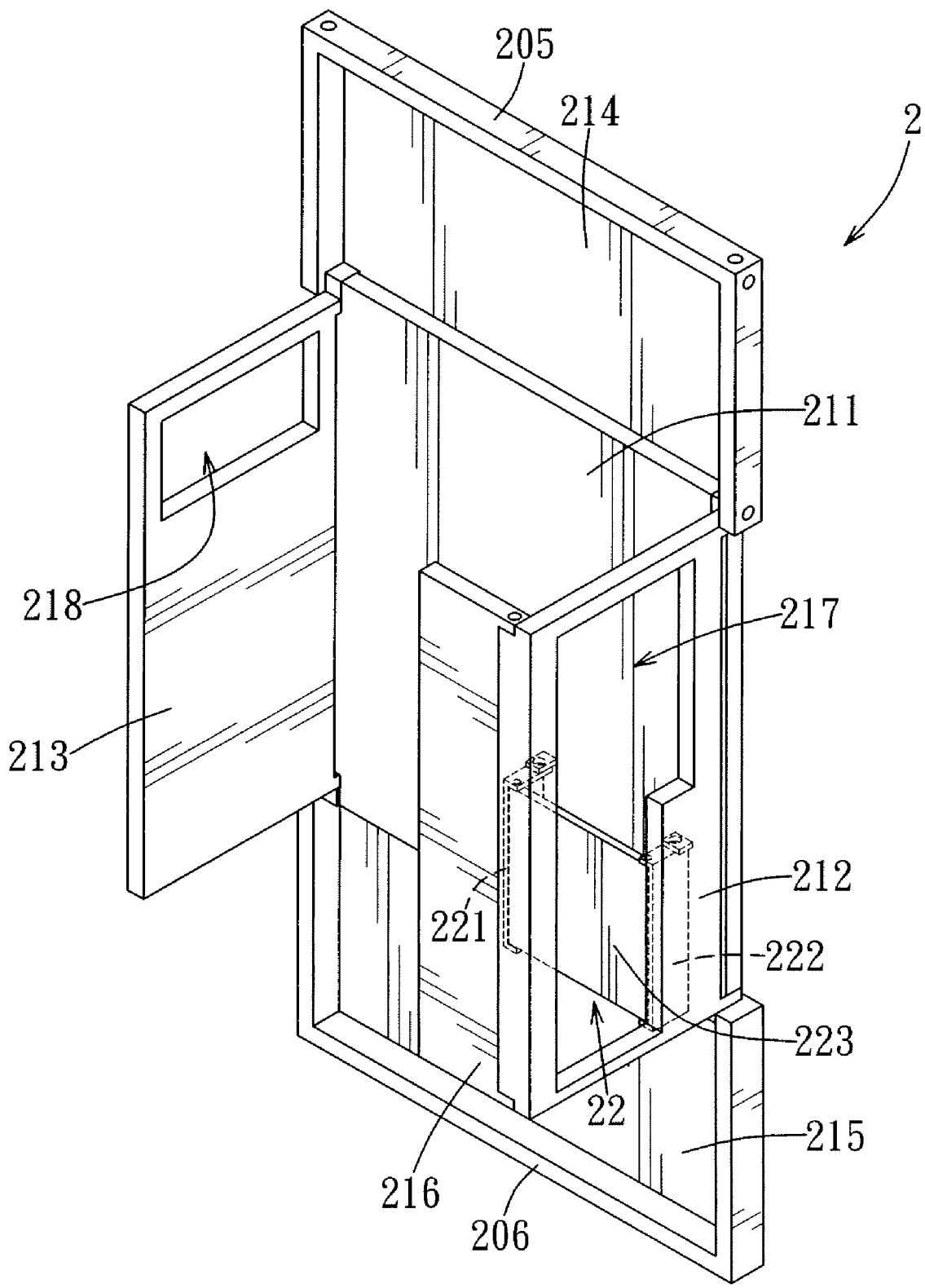
FIG. 5 is a perspective view to illustrate how the preferred embodiment is converted from the flattened state to the assembled state.

Referring to FIGS. 2, 4 and 5, the frame 2 includes a lateral frame panel 211, a front frame panel 212, a rear frame panel 213, a top frame panel 214, a bottom frame panel 215, a support side plate 216, and a disk drive support frame 22. The support side plate 216 and the disk drive support frame 22 are provided to receive a 3.5" disk drive (not shown) therebetween. The positions of and relationship between the support side plate 216 and the disk drive support frame 22 will be described in detail hereinafter. The frame panels 212, 213, 214, 215 are substantially rectangular, and the lateral frame panel 211 has front, rear, top and bottom panel edges 201, 202, 203, 204. The front, rear, top and bottom frame panels 212, 213, 214, 215 are connected respectively and pivotally to the front, rear, top and bottom panel edges 201, 202, 203, 204 of the lateral frame panel 211. In this embodiment, each of the front, rear, top and bottom frame panels 212, 213, 214, 215 has a lateral panel edge with two opposite ends respectively formed with two lugs 23, 24, 25, 26, which are connected respectively and pivotally to two ends of the respective one of the front, rear, top and bottom panel edges 201, 202, 203, 204.

The front frame panel 212 is provided with a front opening 217. An upper half portion of the front opening 217 has a greater width than a lower half portion thereof. The rear frame panel 213 is also provided with a rectangular opening 218 adjacent to a top edge thereof. The support side plate 216 is connected pivotally to the front frame panel 212 opposite to the lateral panel edge of the front frame panel 212 which is connected pivotally to the lateral frame panel 211 such that the support side plate 216 and the lateral frame panel 211 are respectively located at left and right sides of the front frame panel 212. The frame panels 211, 212, 213, 214, 215 are interconnected pivotally such that the frame 2 is convertible between a flattened state and an assembled state. The relative positions of the frame panels 211, 212, 213, 214, 215 in the flattened and assembled states will be described in further detail in the succeeding paragraphs.

Figure 6:
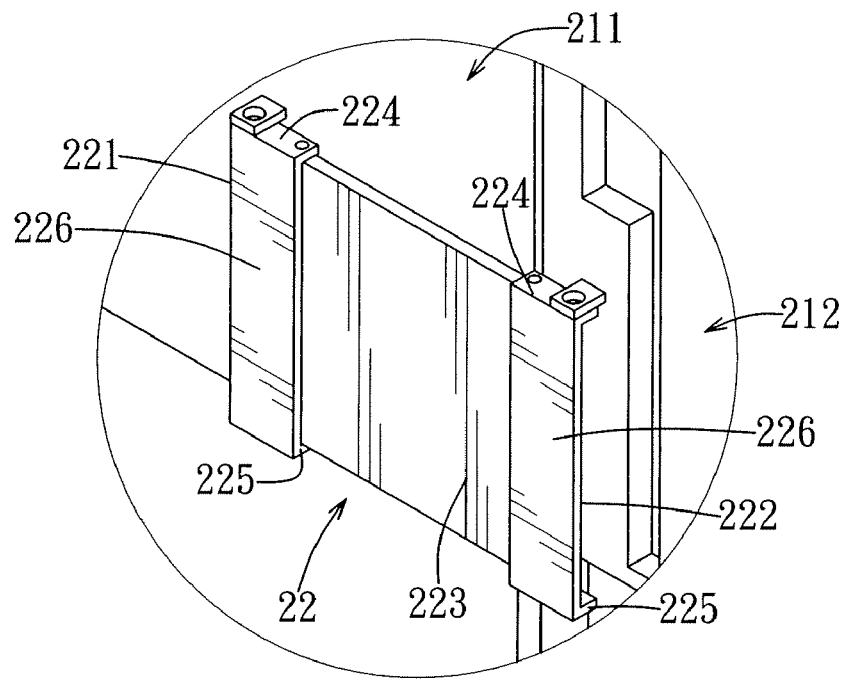
FIG. 6 is an enlarged view of a portion of the preferred embodiment to illustrate the state of a disk drive support frame when the frame is in the flattened state.
Figure 7:
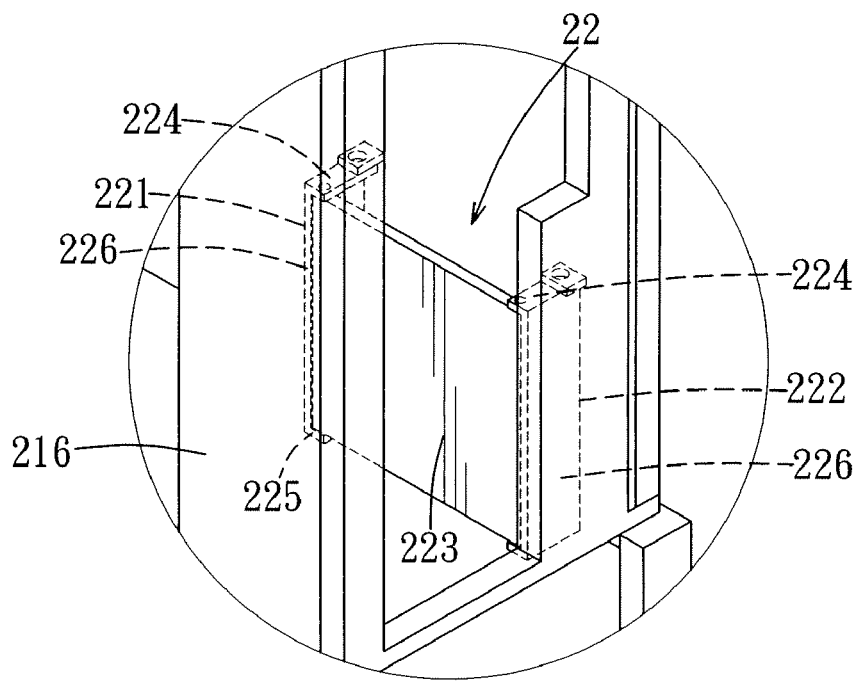
FIG. 7 is an enlarged view of a portion of the preferred embodiment, showing the state of the disk drive support frame when the frame is in the assembled state.

Referring to FIGS. 4, 6 and 7, the disk drive support frame 22 includes two pivot connection plates 221, 222 and a substantially rectangular support plate 223. Each of the pivot connection plates 221, 222 has a substantially U-shaped cross-section, and includes a connecting portion 226 and two pivot portions 224, 225 extending and bending respectively from upper and lower ends of the connecting portion 226. The pivot connection plate 221 is connected pivotally to rear ends of top and bottom edges of the support plate 223 and to an inner panel surface of the lateral frame panel 211 by means of the two pivot portions 224, 225. The pivot connection plate 222 is connected pivotally to front ends of the top and bottom edges of the support plate 223 and to a rear side of the front frame panel 212. Certainly, similar to the pivot connection plate 221, the pivot connection plate 222 may also be connected pivotally to the lateral frame panel 211 instead of being connected to the rear side of the front frame panel 212.

Referring to FIG. 4, when the frame 2 is in a flattened state, the front, rear, top and bottom frame panels 212, 213, 214, 215 are located at the outer sides of the corresponding panel edges of the lateral frame panel 211 and lie in substantially the same plane. The support side plate 216 can then be turned pivotally to rest against the rear side of the front frame panel 212 so as to be juxtaposed with the front frame panel 212. At this point, the support plate 223 of the disk drive support frame 22 is proximate to and rests against the inner panel surface of the lateral frame panel 211, and U-shaped openings of the two pivot connection plates 221, 222 are oriented toward the lateral frame panel 211.

Referring to FIGS. 4 and 5, when it is desired to convert the frame 2 from the flattened state to the assembled state, the front and rear frame panels 212, 213 are pivotally turned toward each other such that they are perpendicular to the lateral frame panel 211. Then, the support side plate 216 is turned rearward relative to the front frame panel 212 such that it is perpendicular to the front frame panel 212.

When the front frame panel 212 is being turned pivotally, due to the rearward pushing action of the front frame panel 212 during the turning, the pivot connection plate 222 connected pivotally to the support plate 223 and the front frame panel 212 will pivot rearward such that the U-shaped opening thereof is oriented toward the rear frame panel 213, while pulling the support plate 223 to move in a direction away from the inner panel surface of the lateral frame panel 211 so as to define a space therebetween. The pivot connection plate 221 connected pivotally to the support plate 223 and the lateral frame panel 211 will also be brought to pivot forward due to the movement of the support plate 223 so that the U-shaped opening thereof is oriented toward the front frame panel 212.

Referring to FIGS. 2 and 5, the top frame panel 214 and the bottom frame panel 215 are subsequently turned pivotally toward each other to a position where they are perpendicular to the lateral frame panel 211 such that they respectively overlay and underlie the top and bottom edges of the front and rear frame panels 212, 213. In this embodiment, the frame 2 further includes U-shaped top and bottom surrounding edge walls 205, 206 that are connected respectively to outer peripheries of the top and bottom frame panels 214, 215. In the assembled state, the top frame panel 214 overlays the top edges of the front and rear frame panels 212, 213, with the top surrounding edge wall 205 surrounding outer sides of the top edges of the front and rear frame panels 212, 213, as best shown in FIG. 2, whereas the bottom frame panel 215 underlies the bottom edges of the front and rear frame panels 212, 213, with the bottom surrounding edge wall 206 surrounding outer sides of the bottom edges of the front and rear frame panels 212, 213, as best shown in FIG. 2. At this time, the front, rear, top, and bottom frame panels 212, 213, 214, 215 are perpendicular to the lateral frame panel 211, and the top and bottom frame panels 214, 215 are also perpendicular to the front and rear frame panels 212, 213, thereby forming the rectangular frame 2, as best shown in FIG. 3. Besides, the support side plate 216 and the support plate 223 are respectively located at two sides of the front frame panel 212 for mounting of the 3.5" disk drive thereamong by locking (or in any conventional manner). An optical disk drive or other electronic hardware devices of the same width can be mounted between an upper portion of the disk drive support frame 22 and the support side plate 216 such that the disk drives (magnetic and optical) can be exposed to the outside through the front opening 217. A power supply (not shown) may be mounted within the frame 2 at an upper rear portion such that the power supply can be exposed through the rectangular opening 218 in the rear frame panel 213. A motherboard (not shown) can be mounted proximate to the lateral frame panel 211.

Finally, the face panel 4 is assembled to and covers a front side of the front frame panel 212, and the two outer side plates 3 are assembled to and cover the left and right sides of the assembled frame 2, respectively, thereby forming a complete computer device. In this embodiment, assembly of the face panel 4 and the two outer side plates 3 to the frame 2 is by threaded engagement, but should not be limited thereto. The face panel 4 and the two outer side plates 3 may alternatively be assembled to the frame 2 by hook fasteners. On the other hand, if it is desired to convert the frame 2 from the assembled state to the flattened state, the top and bottom frame panels 214, 215 are respectively turned upward and downward such that they are in substantially the same plane as the lateral frame panel 211. Then, the front and rear frame panels 212, 213 are respectively turned forward and rearward such that they are also in substantially the same plane as the lateral frame panel 211. At this point, since the support plate 223 of the disk drive support frame 22 is subjected to the forward pulling force of the front frame panel 212 that is being turned forward, the support plate 223 displaces forward slightly to be proximate to the lateral frame panel 211, whereas the pivot connection plates 221, 222 turn pivotally such that the U-shaped openings thereof are oriented toward the lateral frame panel 211.

In sum, the frame panels 211, 212, 213, 214, 215 of the frame 2 of the computer housing according to the present invention can be assembled into a rectangular frame or flattened out by virtue of the pivotal connections. As such, the frame 2 can be flattened out for transport, storage, and display so as to save space, thereby increasing profits. For the user, the flattened-out frame 2 can be assembled without many complicated operations.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A flattenable frame for a computer housing, comprising:
a lateral frame panel; and
a front frame panel, a rear frame panel, a top frame panel, and a bottom frame panel connected pivotally to four panel edges of said lateral frame panel,
wherein:
(A) said front, rear, top, and bottom frame panels are convertible between (i) a flattened state, where said front, rear, top and bottom frame panels are in substantially the same plane, and (ii) an assembled state, where said front, rear, top, and bottom frame panels are turned to a same side of said lateral frame panel, thereby to form a rectangular frame;
(B) said flattenable frame further comprises a disk drive support frame, said disk drive support frame including a support plate and two pivot connection plates, wherein said support plate is connected pivotally to an inner panel surface of said lateral frame panel by one of said pivot connection plates and also is connected to said front frame panel by the other of said pivot connection plates, and wherein said support plate (i) is pivotable to be disposed proximate to said lateral frame panel or to be parallel to said lateral frame panel in a spaced-apart relationship, and (ii) is proximate to said inner panel surface of said lateral frame panel when in the flattened state and is parallel to said lateral frame panel in the spaced-apart relationship when in the assembled state; and
(C) each of said pivot connection plates has a connecting portion and two pivot portions that bend from two ends of said connecting portion in the same direction, each of said pivot connection plates having a substantially U-shaped cross section, one of said pivot connection plates being connected pivotally to rear ends of top and bottom edges of said support plate and to said lateral frame panel by said pivot portions thereof, and the other of said pivot connection plates being connected pivotally to front ends of said top and bottom edges of said support plate and to said front frame panel by said pivot portions thereof.

2. The flattenable frame according to claim 1, wherein said front, rear, top, and bottom frame panels are substantially rectangular, said lateral frame panel having front, rear, top, and bottom panel edges, said front, rear, top, and bottom frame panels being connected respectively and pivotally to said front, rear, top, and bottom panel edges of said lateral frame panel, said front and rear frame panels being disposed perpendicular to said top and bottom frame panels in the assembled state so as to form said rectangular frame.

3. The flattenable frame according to claim 1, further comprising a support side plate connected pivotally to said front frame panel opposite to a lateral edge of said front frame panel which is connected to said lateral frame panel, said support side plate and said support plate being located on left and right sides of said front frame panel to permit mounting of a disk drive between said support side plate and said support plate when said frame is in the assembled state.

4. The flattenable frame according to claim 1, further comprising a face panel and two outer side plates, said face panel being assembled to a front side of said front frame panel, said outer side plates being assembled respectively to left and right sides of said frame.

5. The flattenable frame according to claim 1, further comprising a top surrounding edge wall connected to an outer periphery of said top frame panel, and a bottom surrounding edge wall connected to an outer periphery of said bottom frame panel such that, when said frame is in the assembled state, said top frame panel overlays top edges of said front and rear frame panels, with said top surrounding edge wall surrounding outer sides of said top edges of said front and rear frame panels, and said bottom frame panel underlies bottom edges of said front and rear frame panels, with said bottom surrounding edge wall surrounding outer sides of said bottom edges of said front and rear frame panels.

6. A computer housing, comprising:
a frame including:
a lateral frame panel; and
a front frame panel, a rear frame panel, a top frame panel, and a bottom frame panel connected pivotally to four panel edges of said lateral frame panel said front, rear, top, and bottom frame panels being convertible between (i) a flattened state where said front, rear, top and bottom frame panels are in substantially the same plane, and (ii) an assembled state where said front, rear, top, and bottom frame panels are turned to a same side of the lateral frame panel to thereby form a rectangular frame; and
a face panel disposed on a front side of said front frame panel;
said computer housing further comprising a disk drive support frame, said disk drive support frame including a support plate and two pivot connection plates, wherein said support plate is connected pivotally to an inner panel surface of said lateral frame panel by one of said pivot connection plates and is connected to said front frame panel by the other of said pivot connection plates,
wherein (i) said support plate is pivotable to be disposed proximate to said lateral frame panel or to be parallel to said lateral frame panel in a spaced-apart relationship, and (ii) is proximate to said inner panel surface of said lateral frame panel when in the flattened state and is parallel to said lateral frame panel in the spaced-apart relationship when in the assembled state;
wherein each of said pivot connection plates has a connecting portion and two pivot portions that bend from two ends of said connecting portion in the same direction, each of said pivot connection plates having a substantially U-shaped cross section, one of said pivot connection plates being connected pivotally to rear ends of top and bottom edges of said support plate and to said lateral frame panel by said pivot portions thereof, and the other of said pivot connection plates being connected pivotally to front ends of said top and bottom edges of said support plate and to said front frame panel by said pivot portions thereof.

7. The computer housing according to claim 6, wherein said frame panels are substantially rectangular, said lateral frame panel having front, rear, top, and bottom panel edges, said front, rear, top, and bottom frame panels being connected respectively and pivotally to said front, rear, top, and bottom panel edges of said lateral frame panel, said front and rear frame panels being disposed perpendicular to said top and bottom frame panels in the assembled state so as to form said rectangular frame.

8. The computer housing according to claim 6, wherein said frame further includes a support side plate connected pivotally to said front frame panel opposite to a lateral edge of said front frame panel which is connected to said lateral frame panel, said support side plate and said support plate being located on left and right sides of said front frame panel to permit mounting of a disk drive between said support side plate and said support plate when said frame is in the assembled state.

9. The computer housing according to claim 6, further comprising two outer side plates which are respectively assembled to left and right sides of said frame when said frame is in the assembled state.

10. The computer housing according to claim 6, further comprising a top surrounding edge wall connected to an outer periphery of said top frame panel, and a bottom surrounding edge wall connected to an outer periphery of said bottom frame panel such that, when said frame is in the assembled state, said top frame panel overlays top edges of said front and rear frame panels, with said top surrounding edge wall surrounding outer sides of said top edges of said front and rear frame panels, and said bottom frame panel underlies bottom edges of said front and rear frame panels, with said bottom surrounding edge wall surrounding outer sides of said bottom edges of said front and rear frame panels.

* * * * *